(12) United States Patent
Lim et al.

(10) Patent No.: US 9,020,308 B2
(45) Date of Patent: Apr. 28, 2015

(54) MULTI-CHANNEL OPTICAL MODULE WITH POLYHEDRAL MIRROR

(71) Applicant: Electronics and Telecommunications Research Institute, Daejeon (KR)

(72) Inventors: Kwon-Seob Lim, Gwangju (KR); Seihyoung Lee, Gwangju (KR); Hyun Seo Kang, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 171 days.

(21) Appl. No.: 13/693,081

(22) Filed: Dec. 4, 2012

(65) Prior Publication Data

US 2013/0272665 A1    Oct. 17, 2013

(30) Foreign Application Priority Data

Apr. 16, 2012 (KR) .................. 10-2012-0039131
May 29, 2012 (KR) .................. 10-2012-0056779

(51) Int. Cl.
*G02B 6/32* (2006.01)
*G02B 6/42* (2006.01)
*G02B 6/43* (2006.01)
*G02B 6/36* (2006.01)

(52) U.S. Cl.
CPC ............ *G02B 6/3628* (2013.01); *G02B 6/4214* (2013.01); *G02B 6/423* (2013.01); *G02B 6/4245* (2013.01); *G02B 6/4246* (2013.01); *G02B 6/4249* (2013.01)

(58) Field of Classification Search
CPC .............. G02B 6/00; G02B 6/32; G02B 6/42; G02B 6/43; G02B 6/26; G02B 27/14
USPC ......................... 385/14, 16, 88, 92, 93, 147
See application file for complete search history.

(56) References Cited

U.S. PATENT DOCUMENTS

| | | | | |
|---|---|---|---|---|
| 5,272,501 | A | * | 12/1993 | Nishi et al. ...................... 355/53 |
| 5,408,559 | A | * | 4/1995 | Takahashi et al. .............. 385/89 |
| 2003/0063844 | A1 | | 4/2003 | Caracci et al. |
| 2003/0215240 | A1 | | 11/2003 | Grann et al. |
| 2006/0088255 | A1 | | 4/2006 | Wu et al. |
| 2010/0209103 | A1 | | 8/2010 | Sakigawa et al. |

FOREIGN PATENT DOCUMENTS

KR    10-0626984 B1    9/2006

* cited by examiner

*Primary Examiner* — Akm Enayet Ullah
(74) *Attorney, Agent, or Firm* — Rabin & Berdo, P.C.

(57) ABSTRACT

The multi-channel optical module in accordance with some embodiments of the inventive may comprise a housing; an optical fiber disposed on one side of the housing; a plurality of optical devices disposed on the other side of the housing separated from the optical fiber; and a polyhedral mirror disposed between the optical devices and having mirror sides reflecting an optical signal between the optical fiber and the optical devices.

15 Claims, 8 Drawing Sheets

MULTI-CHANNEL OPTICAL MODULE WITH POLYHEDRAL MIRROR

CROSS-REFERENCE TO RELATED APPLICATIONS

This U.S. non-provisional patent application claims priority under 35 U.S.C. §119 of Korean Patent Application No. 10-2012-0039131, field on Apr. 16, 2012, and 10-2012-0056779, filed on May 29, 2012, the entire contents of which are hereby incorporated by reference.

BACKGROUND

The present inventive concept herein relates to optical communication systems, and more particularly, to a multi-channel optical module that can transmit or receive an optical signal having a plurality of wavelengths using one optical fiber. In case of an active optical cable (AOC) such as a high definition multimedia interface (HDMI), a displayPort, a digital visual interface (DVI), etc. of which demand is increasing recently, 4 or more channels is required which can focus 4 or more wavelengths on one optical fiber to transmit A/V data. However, most of AOC on the market have a structure using 4 or 2 optical fibers. A cable having that structure has a disadvantage that installation and maintenance thereof are difficult and this makes a long distance transmission of optical signal difficult.

A conventional multi-channel optical module that can focus a plurality of wavelengths on one optical fiber has a structure that a beam is reflected in zigzag form using a coarse wavelength division multiplexing (CWDM) filter to be optically coupled. In this case, since an optical path difference between wavelengths is great, a general focusing lens cannot be used and an alignment is very difficult.

In case of multi-channel optical module having a structure that a plurality of optical transmission parts or optical reception parts based on TO-CAN processing one wavelength is aligned with a metal housing, and then the plurality of optical transmission parts or optical reception parts are fixed by a laser welder, an optical coupling is not easy. This is because the multi-channel optical module has a structure that the optical signal is reflected or penetrated by an optical filter mounted in the metal housing to optically couple to one optical fiber.

The multi-channel optical module comprises two sides of 45° on which filters are mounted. Since the two sides of 45° have V-groove shape, the processing of the sides is very difficult. In particular, it is almost impossible to polish a side of 45° and processability of side of 45° is very bad. The multi-channel optical module has a structure that it is processed in a cylindrical form and rotates in a metal housing and thereby an optical path is tilted. Thus, in the case that a mismatching occurs due to the rotation, efficiency of optical coupling to an optical fiber is low.

In case of a multi-channel optical module using a conventional WDM optical filter, since a distance between wavelengths of light source used for wavelength division is great, arrival times of wavelengths are different from one another when transmitting wavelengths a long distance and thereby a long distance transmission is difficult. Therefore, a delay time correction circuit is needed.

In case of an optical module of 4 or more channels, since it is difficult to produce the optical module in a single body, two or more filters are used. In this case, since a filter and a holder are separately mounted, locations of the filter and the holder are different from each other and thereby the filter cannot be aligned with the holder. An incident beam or an output beam is tilted. The more the number of channels is, the more serious those phenomenon is.

SUMMARY

Embodiments of the inventive concept provide a multi-channel optical module. The multi-channel optical module may comprise a housing; an optical fiber disposed on one side of the housing; a plurality of optical devices disposed on the other side of the housing separated from the optical fiber; and a polyhedral mirror disposed between the optical devices and having mirror sides reflecting an optical signal between the optical fiber and the optical devices.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
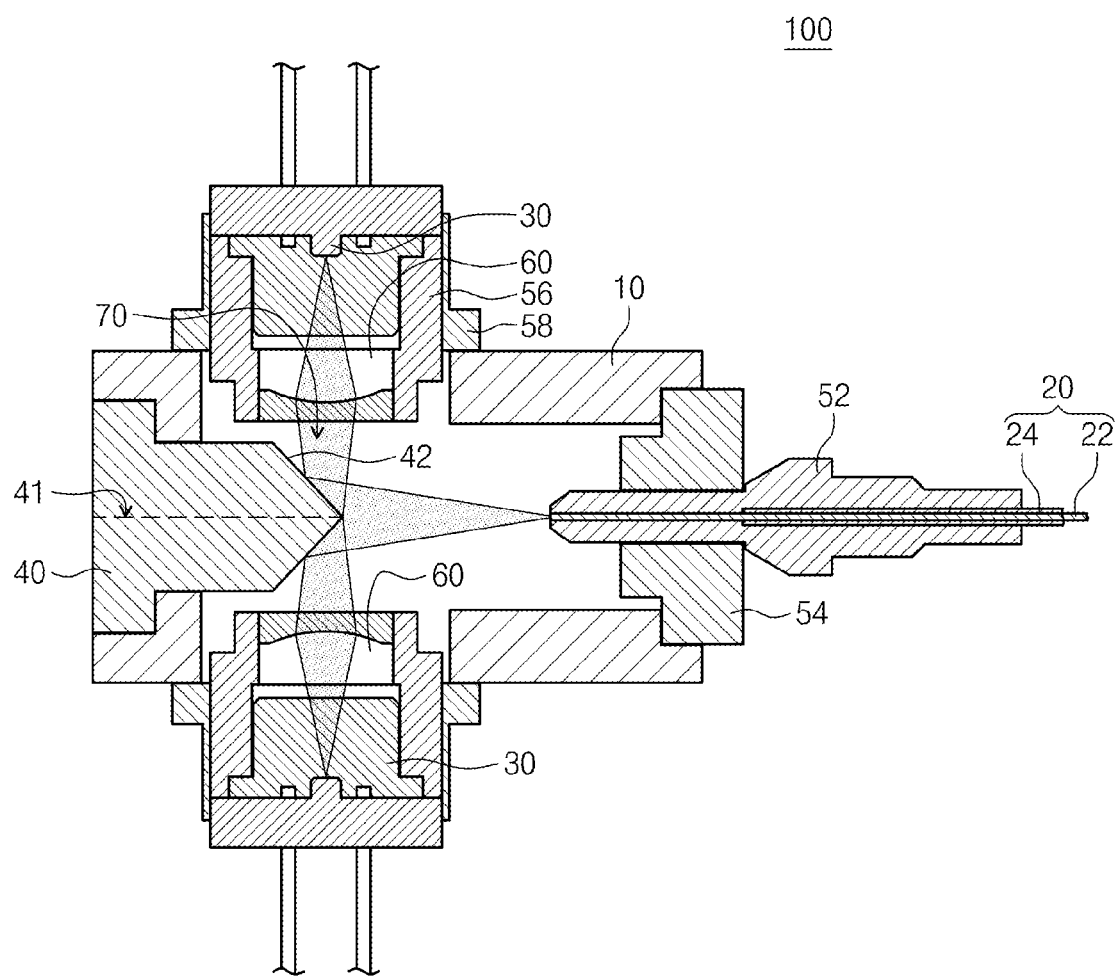
FIG. 1 is a drawing illustrating a multi-channel optical module in accordance with some embodiments of the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

FIG. 1 is a drawing illustrating a multi-channel optical module in accordance with some embodiments of the inventive concept.

Referring to FIG. 1, a multi-channel optical module 100 may comprise a polyhedral mirror 40 having a plurality of mirror sides 42 reflecting an optical signal 70 between a plurality of optical devices and one optical fiber 20. The mirror sides 42 of the polyhedral mirror 40 may have one-to-one correspondence to the optical devices 30. The mirror sides 42 can reflect the optical signal 70 between the optical devices 30 and the optical fiber 20.

The polyhedral mirror 40 and the optical fiber 20 may be disposed on both sides of housing 10. The housing 10 can align a central axis of the polyhedral mirror 40 and the optical fiber 20 with a first direction. The housing 10 can fix the optical devices 30 separated from the polyhedral mirror 40. The optical fiber 20 may comprise a core 22 transmitting the optical signal 70 and a cladding 24 surrounding the core 22. The optical fiber 20 may be fixed to the housing 10 by a first pitting 52 and a first holder 54.

The optical devices 30 may comprise a light emitting device, a photo detecting device, a light receiving device, a light transmitter or a light receiver. The optical devices 30 may be disposed in a second direction while being perpendicular to the first direction or having an arbitrary angle. The optical devices 30 can transmit and/or receive the optical signals 70 of different wavelengths. It may be desirable that the optical signal 70 has a close wavelength that can minimize a delay time when it is transmitted a long distance in the optical fiber 20. The optical devices 30 may comprise TO (transistor outline)-CAN package. Lenses 60 may be disposed between the optical devices 30 and the polyhedral 40. The lenses 60 can move ahead with the optical signal 70 emitted from the optical devices 30 at a certain line width. The lenses 60 can focus the optical signal 70 on the optical devices 30. The optical devices 30 and the lenses 60 may be combined with each other by second fittings 56. Second holders 58 can fix the second fittings 56 to the housing 10.

The mirror sides 42 may symmetrically incline with respect to the central axis 41. Even though not shown in the drawings, lens is disposed between the optical fiber and the polyhedral mirror. When the optical devices 30 are emitting devices, the mirror sides 42 reflect the optical signal 70 to focus it on the optical fiber 20.

Figure 2:
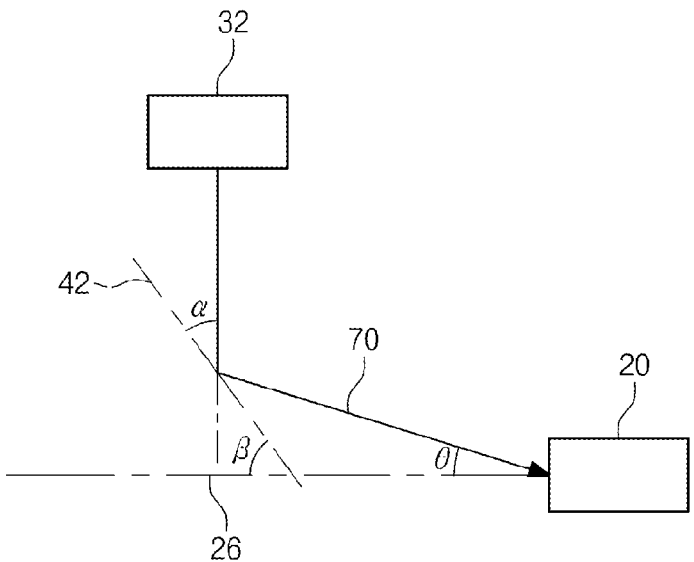
FIG. 2 is a drawing illustrating a light emitting device, a mirror side, and an included angle, a tilt angle and an incident angle in an optical fiber.

FIG. 2 is a drawing illustrating a light emitting device 32, a mirror side 42, and an included angle $\alpha$, a tilt angle $\beta$ and an incident angle $\theta$ in an optical fiber 10.

Referring to FIG. 2, the included angle $\alpha$ may be defined by an angle between the mirror side 42 which inclines with respect to an extension line 26 of the optical fiber 20 and the optical signal 70 vertically entering the extension line 26 of the optical fiber 20. The included angle $\alpha$ may be 90°—a tilt angle $\beta$ of the mirror side 42 with respect to the extension line 26 of the optical fiber 20. A reflection angle (not shown) of the optical signal 70 with respect to the mirror side 42 may be equal to the tilt angle $\beta$ of the mirror side 42. The incident angle $\theta$ may be an angle between the optical signal 70 reflecting from the mirror side 42 to enter the optical fiber 20 and the extension line 26 of the optical fiber 20. That is, the incident angle $\theta$ may be defined by an inclined angle of the optical signal 70 with respect to a normal line of cutting plane of the optical fiber 20. Thus, the optical signal 70 can be reflected from the mirror side 42 to optically couple to the optical fiber 20 at arbitrary incident angle $\theta$.

Figure 3:
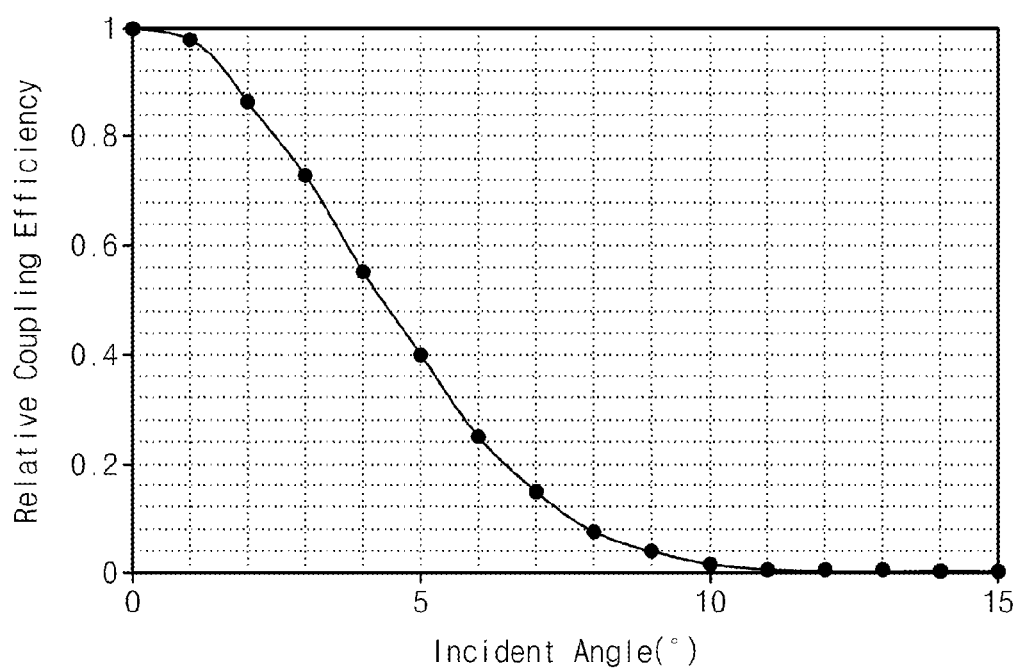
FIG. 3 is a graph illustrating a relative coupling efficiency of optical fiber relative to an incident angle of optical signal.

FIG. 3 is a graph illustrating a relative optical coupling efficiency of optical fiber 20 relative to an incident angle $\theta$ of optical signal 70.

Referring to FIG. 3, if defining an optical coupling efficiency of the optical signal 70 having an incident angle $\theta$ of 0° as 1, the optical signal 70 of incident angle $\theta$ of 4° may have an optical coupling efficiency of about 55% in the optical fiber 20. The optical signal 70 may have an optical coupling efficiency of about 40% at an incident angle $\theta$ of 5°. An optical coupling efficiency may be determined by an incident angle $\theta$. The optical signal 70 may be transmitted to the optical fiber 20 while having an optical coupling efficiency which is in inverse proportion to an incident angle $\theta$.

Figure 4:
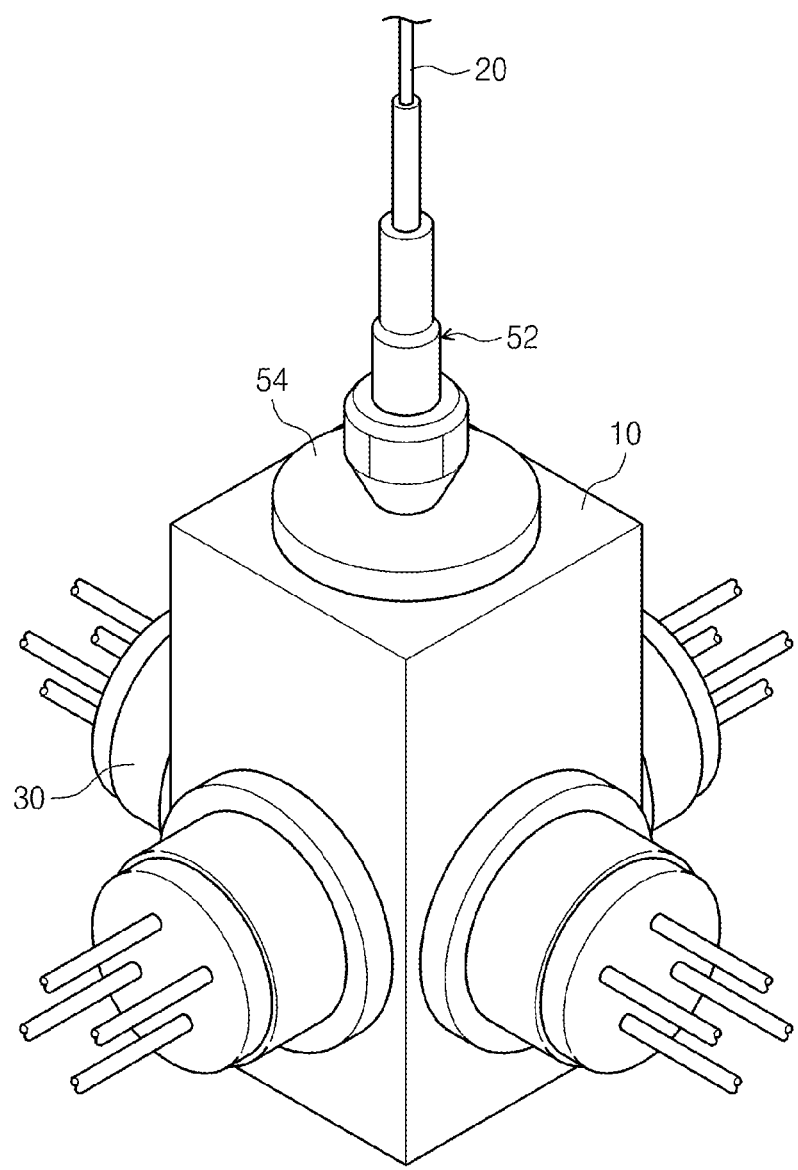
FIG. 4 is a perspective view illustrating a 4-channel optical module in accordance with an application example of the inventive concept.
Figure 5:
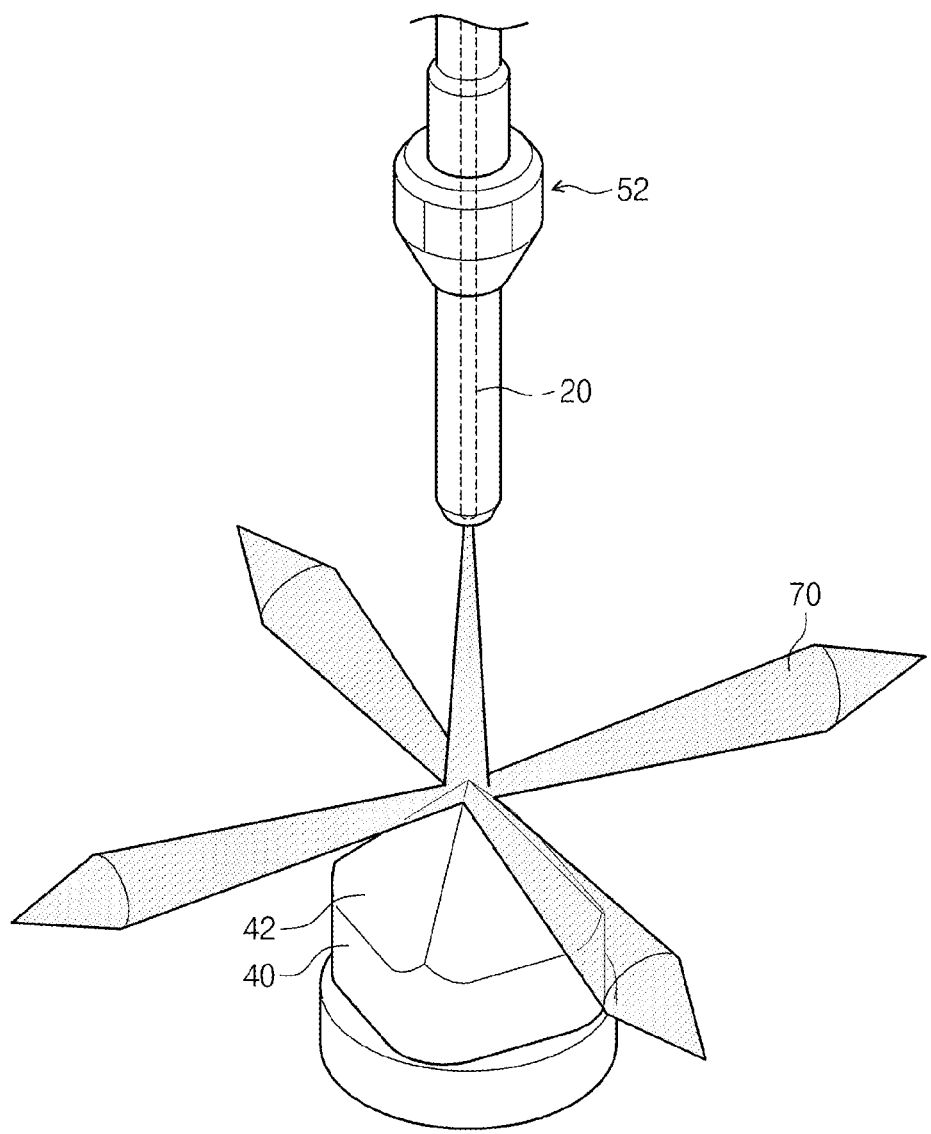
FIGS. 5 and 6 are penetration perspective views for explaining that 4 optical signals are focused on an optical fiber.
Figure 6:
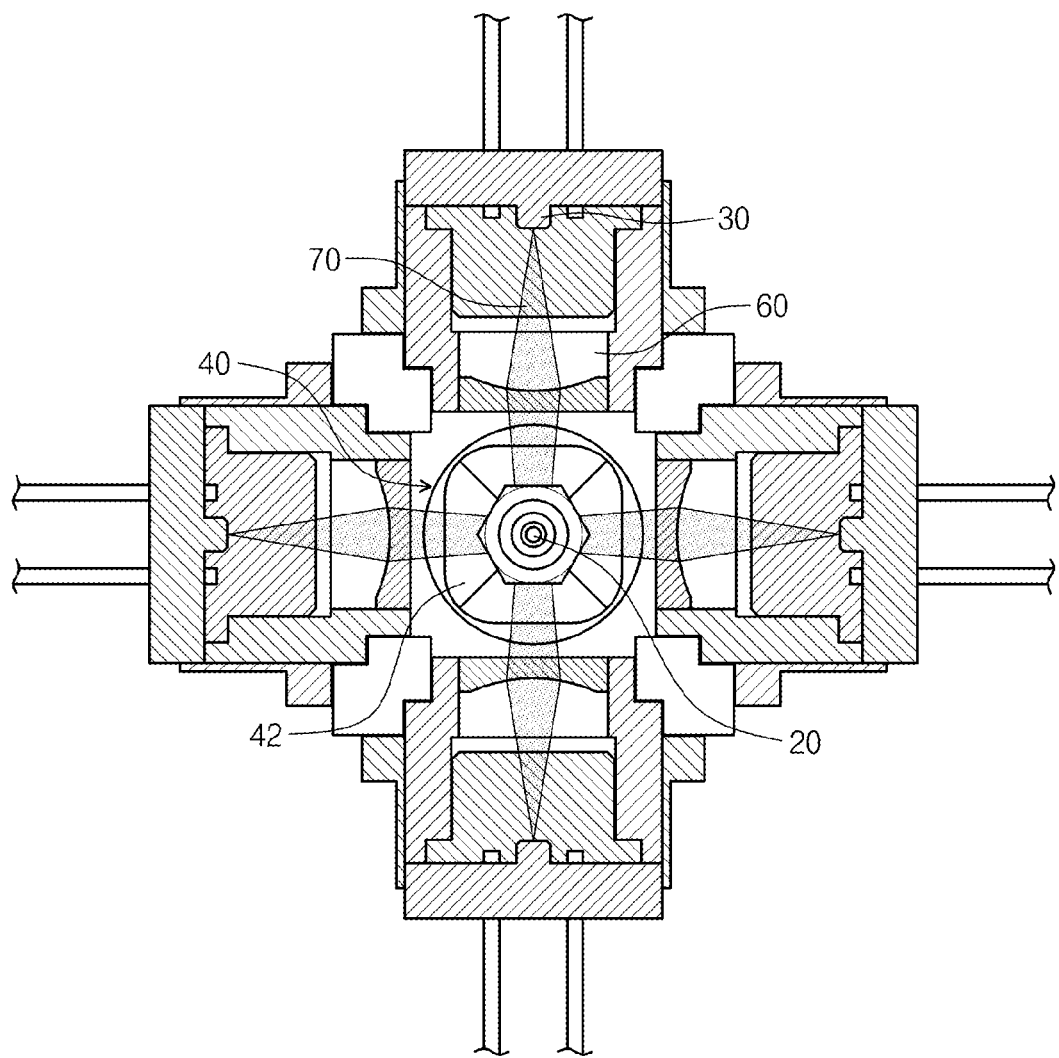

FIG. 4 is a perspective view illustrating a 4-channel optical module in accordance with an application example of the inventive concept. FIGS. 5 and 6 are penetration perspective views for explaining that 4 optical signals are focused on an optical fiber.

Referring to FIGS. 4, 5 and 6, the 4-channel optical module can focus the optical signal 70 on one optical fiber 20 from 4 optical devices 30. The optical signal 70 may be reflected from mirror sides 42 of the polyhedral mirror 40 between the optical devices 30 and the optical fiber 20. The polyhedral mirror 40 may comprise a quadrangular pyramid having 4 mirror sides 42. The optical signal 70 may enter with included angles $\alpha$ of about 41° respectively with respect to 4 mirror sides 42 of the polyhedral mirror 40, and then may be reflected from the optical fiber 20. In this case, the optical signal 70 may be optically coupled to the optical fiber 20 with an incident angle $\theta$ of about 4°.

Thus, the 4-channel optical module can transmit 4 optical signals 70 having different wavelengths to one optical fiber 20. However, the inventive concept is not limited thereto. According to some other application examples, the polyhedral mirror 40 can divide the optical signal 70 output from the optical fiber 20 to supply it to the optical devices 30. At this time, the optical devices 30 may comprise a blocking filter penetrating only a specific wavelength of the optical signal 70 and reflecting or absorbing the rest of the wavelengths, and a light receiving device sensing the optical signal 70 which penetrated the blocking filter. Blocking filter of each of the optical devices 30 can penetrate an optical signal having a different wavelength. Thus, the 4-channel optical module in accordance with some other application examples can selectively extract the optical signal 70 having multi-wavelength.

Figure 7:
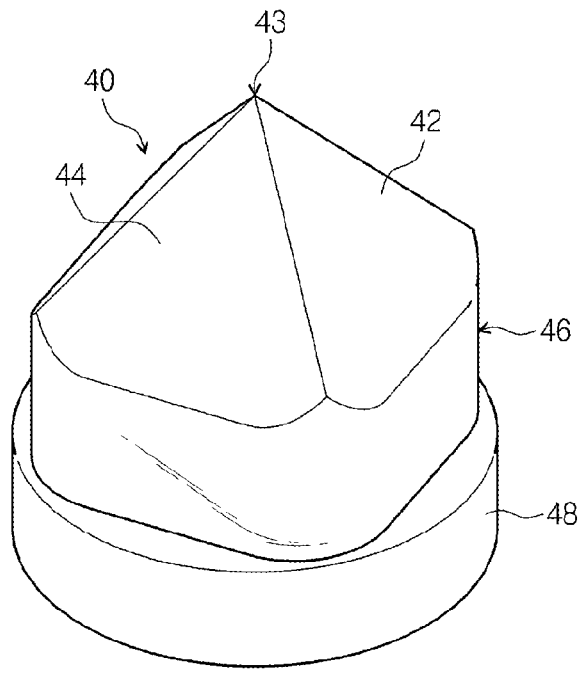
FIG. 7 is a perspective view of polyhedral mirror.

FIG. 7 is a perspective view of polyhedral mirror.

Referring to FIGS. 1 and 7, the polyhedral mirror 40 may comprise a pyramid 44, a pillar 46 and a third fitting 48. The pyramid 44 may have 4 mirror sides 42 connected to a tip 43. The mirror sides 42 may have a rounded triangular shape. The pyramid 44 may be connected to the pillar 46 facing the third fitting 48. The pillar 46 may comprise a rounded square pillar having the same number of sides as the mirror sides 42. the pillar 46 has at the least one of align surfaces coupled guide 18 of the housing 10. The third fitting 48 may comprise a disk fixing the pillar 46. The third fitting 48 is combined with the other side of the housing 10 to fix the pillar 46 and the pyramid 44. The polyhedral mirror 40 may have a short nail shape inserted into the housing 10.

Figure 8:
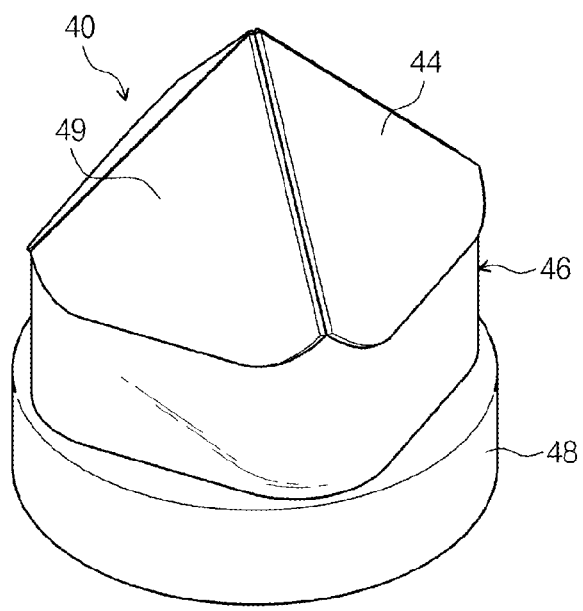
FIG. 8 is a perspective view illustrating thin film mirrors in polyhedral mirror.

FIG. 8 is a perspective view illustrating thin film mirrors 49 in polyhedral mirror 40.

Referring to FIGS. 1, 7 and 8, the polyhedral mirror 40 may comprise thin film mirrors 49 connected to an inclined plane of the pyramid 44. The thin film mirrors 49 can reflect the optical signal 70 being transmitted from the optical devices 30 to the optical fiber 20.

Figure 9:
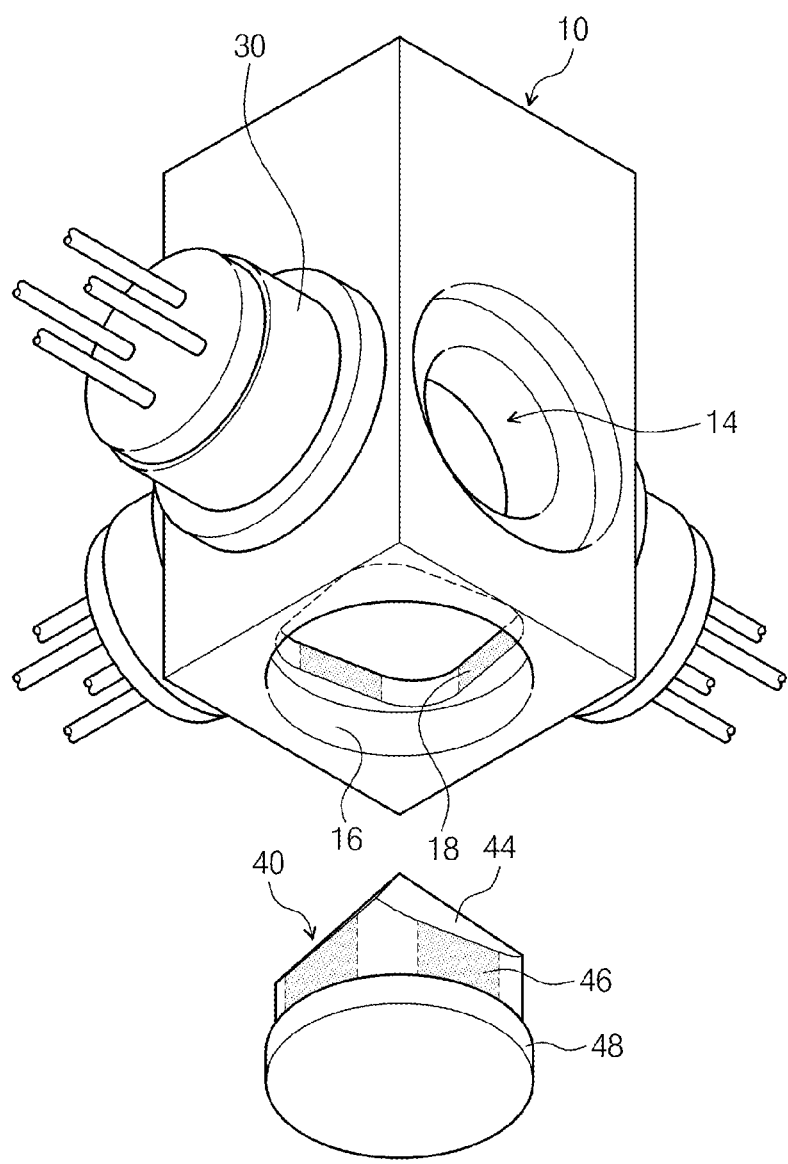
FIG. 9 is a perspective view illustrating a hosing and a polyhedral mirror in an optical module of 4 channels.

FIG. 9 is a perspective view illustrating a hosing 10 and a polyhedral mirror 40 in an optical module of 4 channels.

Referring to FIGS. 1 and 9, the housing 10 may comprise second holes 14 and third holes 16 into which the optical devices 30 and the polyhedral mirror 40 are inserted and a guide 18 aligning the pyramid 44 of the polyhedral mirror 40 in the third hole 16. The guide 18 can align the pillar 46 of the polyhedral mirror 40. The guide 18 can expose the mirror sides 42 of the pyramid 44 in the same direction by the second holes 14. The mirror sides 42 may be orthogonal projection-aligned with the second holes 14. The housing 10 and the polyhedral mirror 40 can be accurately and easily combined with each other.

Thus, the 4-channel optical module in accordance with some application examples of the inventive concept can improve the productivity.

Figure 10:
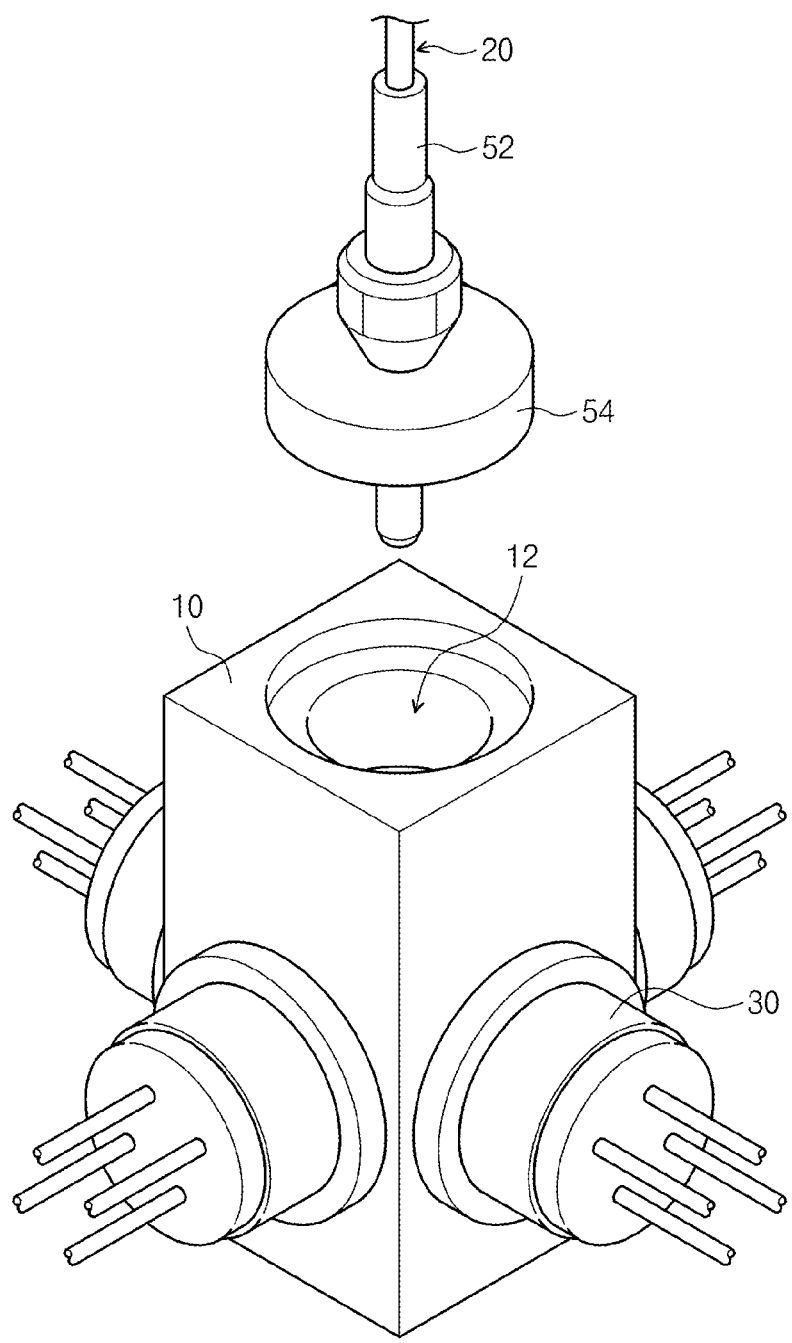
FIG. 10 is a perspective view illustrating housing and optical fiber.

FIG. 10 is a perspective view illustrating housing 10 and optical fiber 20.

Referring to FIGS. 1 and 10, a first fitting 52 and a first holder 54 fix the optical fiber 20 and can be inserted into a first hole 12. The first fitting 52 and the first holder 54 can align the optical fiber 20 with the polyhedral mirror 40 by the first hole 12 of the housing 10. The first fitting 53 may comprise at least one of terminal cap, joint, socket and union fixing the optical fiber 20 to the first holder 54. The first holder 54 may comprise a nut or disk fixing the first fitting 52 to the housing 10. The optical fiber 20 can be aligned with the polyhedral mirror 40 in the housing 10 by the first fitting 52 and the first holder 54.

The multi-channel optical module in accordance with some embodiments of the inventive concept can improve the productivity. The multi-channel optical module has a pigtail shape which is produced in a single body. Although not illustrated, the inventive concept may have a receptacle shape including a ferrule and/or an optical fiber connector that are inserted into the housing.

According to the multi-channel optical module, it may comprise a housing, optical fiber and optical devices on both sides of the housing, and polyhedral mirror between the optical devices. The polyhedral mirror can have mirror sides of simple structure vertically reflecting an optical signal transmitted between the optical devices and the optical fiber. An alignment of the polyhedral mirror and an insertion of the housing may be performed at the same time. Thus, the optical module in accordance with some embodiments of the inventive concept can improve the productivity.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein

What is claimed is:

1. A multi-channel optical module comprising:
a housing;
an optical fiber disposed on one side of the housing;
a plurality of optical devices disposed on the other side of the housing separated from the optical fiber; and
a polyhedral mirror disposed between the optical devices and having mirror sides reflecting an optical signal between the optical fiber and the optical devices.

2. The multi-channel optical module of claim 1, wherein the polyhedral mirror comprises a pyramid.

3. The multi-channel optical module of claim 2, wherein the polyhedral mirror further comprises thin film mirrors covering the pyramid.

4. The multi-channel optical module of claim 3, wherein the polyhedral mirror further comprises a pillar extending from the pyramid and a third fitting disposed on the other side of the pillar.

5. The multi-channel optical module of claim 4, wherein the pillar has at least one of align surfaces.

6. The multi-channel optical module of claim 5, wherein the housing comprises a first hole into which the optical fiber is inserted, a second hole into which the optical devices are inserted and a third hole into which the polyhedral mirror is inserted.

7. The multi-channel optical module of claim 6, wherein the housing further comprises a guide coupled the align surfaces of the pillar of polyhedral mirror in the third hole.

8. The multi-channel optical module of claim 6, further comprising a first fitting or a first holder fixing the optical fiber in the first hole of the housing.

9. The multi-channel optical module of claim 6, further comprising a second fitting or a second holder fixing the optical devices in the second hole of the housing.

10. The multi-channel optical module of claim 1, wherein the optical devices comprise a light emitting device, a photo detecting device, a transmitter or a receiver.

11. The multi-channel optical module of claim 1, wherein the optical devices comprise TO-CAN.

12. The multi-channel optical module of claim 1, wherein the optical devices comprise a light receiving device and a blocking filter.

13. The multi-channel optical module of claim 1, further comprising lenses disposed between the optical devices and the polyhedral mirror.

14. The multi-channel optical module of claim 1, further comprising a lens disposed between the optical fiber and the polyhedral mirror.

15. The multi-channel optical module of claim 1, wherein the polyhedral mirror has a nail shape.

* * * * *